United States Patent Office 3,395,170
Patented July 30, 1968

3,395,170
SULFATION OF SECONDARY ALCOHOLS
John M. Walts, Clark, and Leslie M. Schenck, Mountainside, N.J., assignors to General Aniline & Film Corporation, New York, N.Y., a corporation of Delaware
No Drawing. Filed June 28, 1966, Ser. No. 560,994
6 Claims. (Cl. 260—458)

ABSTRACT OF THE DISCLOSURE

Sulfated secondary alcohols are obtained by heating one mole of a mixture consisting of 10 percent to 70 percent by weight of at least one secondary alcohol of from 8 to 25 carbon atoms and from 30 percent to 90 percent by weight of a non-ionic surface active agent having the molecular configuration of the condensation product of at least one mole of alkylene oxide of from 2 to 4 carbon atoms with one mole of a hydroxyl compound selected from the class consisting of phenols, alkylphenols and primary aliphatic hydrocarbon alcohols of from 1 to 24 carbon atoms and secondary aliphatic hydrocarbon alcohols of from 3 to 24 carbon atoms with one mole of sulfamic acid at a temperature of from 100° to 150° C. for a period of time sufficient to convert the said secondary alcohol and the said non-ionic surface active agent to their respective sulfates.

---

This invention relates to a novel method of sulfating secondary alcohols.

It is known that sulfated secondary alcohols are useful surfactants. Due to the difficulty of sulfation, most of the secondary sulfates made in the past have been prepared by direct sulfation of an olefin. More recently, with the commercial advent of α-olefins, there has been renewed interest in this field. Sulfates of the α-olefins are reported to be predominantly the 2-isomer. (Chippinger, Ind. Eng. Chem. Prod. Res. Develop., 3, 3 (1964).) In contrast, the sulfates of linear secondary alcohols have configurations based on the random distribution of the hydroxyl group along the chain. Although primary alcohol sulfates are commercially available by either oleum, $SO_3$, chlorosulfonic acid or sulfamic acid sulfation techniques, the same is not true of secondary or tertiary alcohols due to inherent difficulties in their sulfation.

Alcohols are classified as primary, secondary or tertiary, depending on how many hydrogen atoms are attached to the carbon atoms holding the hydroxyl group. The stability of primary, scondary and tertiary alcohols towards dehydration varies with their structure. Schmidt, Textbook of Organic Chemistry, D. Van Nostrand Company, Inc., 1943, p. 123, states that secondary and tertiary alcohols lose water more readily than primary alcohols. In fact, many tertiary alcohols pass into unsaturated hydrocarbons at the moment of their formation or merely on distillation. Dehydration of these type alcohols is also promoted by acidic conditions or by dehydration catalysts. Sulfuric acid and phosphoric acid are commonly used in this respect. Conant, Chemistry of Organic Compounds, The Macmillan Company, 1939, p. 60–61, considers treatment of alcohols with sulfuric acid in indirect method of dehydration. The sulfuric acid ester thus formed usually decomposes upon heating with the formation of olefin nad regeneration of sulfuric acid according to the following equation:

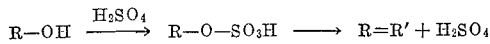

When sulfuric acid is used, the reaction is often complicated by polymerization of the olefin under influence of the acid. As an indication of the order of alchol stability towards dehydration, Conant states that tertiary alcohols are particularly easy to dehydrate because the catalysts are effective at relatively low temperature; secondary alcohols in this respect fall between primary and tertiary alcohols. As an order of magnitude, he cites the following examples:

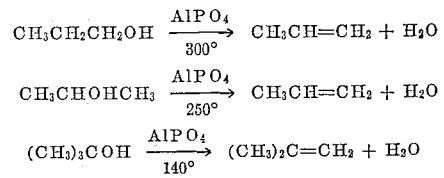

The accuracy of Conant's statements is attested by the complexity of conditions required for synthesis of the secondary alcohol sulfates. Livingston, Drogin and Kelly, in an article entitled "Detergency and Biodegradability of Alcohol-Based Sec-Sulfates," Ind. Eng. Chem. Prod. Res. Develop. 4, 28 (1965), report the procedure of sulfating secondary alcohols by the reaction of a secondary alcohol with a chlorosulfonic acid-ether complex at 0° to 5° C. over a ten-minute period. The reaction mixture is stirred and purged with nitrogen for a period of sufficient time to remove all of the hydrogen chloride formed. After neutralization with caustic soda, the resulting mixture is diluted with aqueous isopropyl alcohol solution and extracted with several proportions of petroleum ether to remove unsaturated oil. The aqueous alcohol layer is stripped and the residue dried.

Schlegel, Ger. 852, 692 CA 50, 4533 (1956), followed a similar scheme using saturated $C_4$–$C_9$ fatty acids as a solvent. In his method, 67 parts of chlorosulfonic acid were added to 80 parts of a $C_4$–$C_6$ fatty acid, then 115 parts of a $C_{11}$–$C_{17}$ secondary alcohol added at 20° C. and reacted until the admixture became alkali soluble.

Detailed information is not available on the use of $SO_3$ for synthesis of secondary alcohol sulfates. In respect to use of the common industrial sulfating agent, sulfamic acid, Martin E. Cupery, in Industrial and Engineering Chemistry, vol. 30, 1936, p. 629, states, "Primary alcohols react smoothly with sulfamic acid upon heating and yield the corresponding alkyl ester of ammonium acid sulfate. For example, methanol refluxed with sulfamic acid for several hours yields ammonium methyl sulfate. Similar reactions are obtained with long chain primary alcohols, glycols and glycerol. Secondary and tertiary alcohols do not react with sulfamic acid."

It is the principal object of the present invention to provide a novel process by which secondary alcohols, linear and branched, are readily sulfated with sulfamic acid in the presence of an alkoxylate of a phenol or a primary or a secondary alcohol alkoxylate to yield a mixture of surfactants having excellent detergent properties.

Other objects and advantages will become manifest from the following description.

Contrary to the teachings of the foregoing prior art, we have found that secondary alcohols, linear and branched, are readily sulfated in substantial yields with sulfamic acid in the presence of an alkoxylate of a phenol, or an alkoxylate of a primary or secondary alcohol. In the practice of our invention, one mole of a mixture consisting of 10% to 70% by weight of at least one secondary alcohol, linear or branched, containing from 8 to about 25 carbon atoms and from 30% to 90% by weight of an alkoxylated phenol, alkoxylated primary alcohol or alkoxylated secondary-alcohol is reacted with one mole of sulfamic acid at a temperature of from 100°–150° C., preferably within the range of 115°–125° C. for a period of time until both the secondary alcohol and the alkoxylate are converted to their respective sulfates. The time for sulfation may range from 1 to 4 hours. The completion of the sulfation reaction, however, can be readily determined by the methylene blue analysis described by S. R. Epstein in Trans. Faraday Society, vol. 44, pages 226–230, 1948. Upon completion of the sulfation, the reaction mixture is preferably neutralized with ammonia or an alkanolamine of from 2 to 4 carbon atoms and diluted with about an equal mixture of water and a low boiling alcohol of from 1 to 4 carbon atoms to an active concentration of 40–60%.

As examples of secondary alcohols of from 8 to 25 carbon atoms, either branched or straight chain which may be sulfated as such or in admixture in accordance with the process of the present invention, the following are illustrative: 2-octanol, 4-octanol, 2-nonanol, 3-nonanol, 4,6,8-trimethyl-2-nonanol, 2-nonanol, 2-decanol, undecanol-5, dodecanol-2, dodecanol-5, tridecanol-2, tridecanol-4, tridecanol-7, tetradecanol-2, tetradecanol-3, tetradecanol-5, pentadecanol-2, pentadecanol-6, pentadecanol-8, hexadecanol-2, hexadecanol-7, octadecanol-5, 3-methylheptanol-2; 5-ethylheptanol-2; 2-methylnonanol-4; 5-ethylnonanol-2; 3-ethyl-8-methylnonanol-6; 3-ethylundecanol-6; 7-ethyl-2-methylundecanol-4; 3,9-diethylundecanol-6; 5-ethyl-tridecanol-8; 9-ethyl-5-methyltridecanol-6; 3,9-diethyltridecanol-6; 5,11 - diethylpentadecanol - 8; 7-ethyl-2-methylundecanol-4; 3,9-diethyltridecanol-6; 5,11-diethylpentadecanol-8; 7-ethyl-2-methylundecanol-4; 3,9-diethyltridecanol-6; 5,11-diethylpentadecanol-8, tetracosanol-2, and the like.

Secondary alcohols produced by the hydrolysis of 2-bromides as well as a mixture of isomeric secondary alcohols obtained by the sulfation of alpha-olefins of from 8 to 24 carbon atoms with sulfuric acid followed by hydrolysis may be sulfated in accordance with the present invention. Secondary alcohols of from 8 to 24 carbon atoms as well as mixtures thereof prepared in accordance with the teachings of U.S. Patents 2,088,014–21 are also readily sulfated in accordance with the present invention.

The primary or secondary alcohol alkoxylates that are employed in the process of the present invention are those that are prepared by alkoxylation of one mole of a primary alcohol of from 1 to 24 carbon atoms or secondary alcohol of from 3 to 24 carbon atoms with 1 to 20 moles of an alkylene oxide such as ethylene oxide, propylene oxide or butylene oxide.

The alkoxylated phenols that are employed in the process of the present invention are characterized by the following structure:

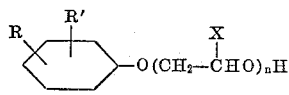

wherein R and R' are selected from the group consisting of hydrogen or an alkyl radical of from 1 to 18 carbon atoms, $n$ is an integer between 1 and 100, and X represents either hydrogen, methyl or ethyl group.

The alkoxylated phenols and alkoxylated straight and branched chain primary and secondary alcohols readily prepared by the usual methods known to the art are more fully described in U.S. Patents 1,970,578; 2,203,883; 2,213,477, 2,575,832, 2,593,112, 2,676,975, 2,853,471 and 3,033,889. The various alkoxylates disclosed in these references are generally defined as non-ionic surface active agents having the molecular configuration of the condensation product of at least one mole of alkylene oxide, such as ethylene oxide, propylene oxide or butylene oxide, with one mole of a mono hydroxylic compound of the group of phenols, alkylated phenols and primary and secondary aliphatic hydrocarbon alcohols of from 1 to 24 carbon atoms.

Our preferred weight ratio of secondary alcohol to alkoxylate is from 10% by weight to 40% by weight of secondary alcohol and 60% to 90% by weight of the alkoxylate. We prefer using alkylphenols having from 8 to 12 carbons in the alkyl chain, and ethoxylated with about 25 to 55% ethylene oxide, or primary and secondary alcohol ethoxylates containing from 8 to 16 carbons in the hydrophobic portion, and about 25 to 55% ethylene oxide by weight. The sulfamic acid is normally reacted in a stoichiometric quantity based upon the hydroxyl number of the admixture.

The following examples will illustrate the practice of our process. All parts are by weight unless otherwise noted.

EXAMPLE 1

To 415 grams (2.0 moles) of a secondary alcohol admixture analyzing for the following carbon content: $C_{11}$, 0.5%; $C_{12}$, 8.9%; $C_{13}$, 38.0%; $C_{14}$, 40.0%; $C_{15}$, 9.8%; and $C_{16}$, 2.7%, with an average molecular weight of 207 and with a hydroxyl number of 269 was added at 100° C., using 0.05% by weight $BF_3$ catalyst, a total of 185 grams (4.2 moles) of ethylene oxide. The product, 600 grams, was neutralized to a pH above 7 with alcoholic sodium hydroxide solution and filtered.

One hundred sixty grams of the above secondary alcohol ethoxylate-secondary alcohol admixture containing 27.8% by weight of unreacted secondary alcohols and having a hydroxyl number of 189.9 (M.W. 295) (0.54 mole) was reacted with 53.5 grams of sulfamic acid (0.55 mole) at 115–125° C. for three hours. The reaction mixture was made alkaline through the addition of one gram of ethanolamine, and diluted with 50–50 ethanol-water to a weight of 358 grams. By the methylene blue analysis, the desired ammonium sulfate ester of the secondary alcohol ethoxylate-secondary alcohol admixture was obtained in 98.9% yield.

At a 0.05% active concentration in 200 p.p.m. water, the above nonionic detergent washed 20 dishes by the method of Mayhew, Jelinek and Stefcik, Soap and Chemical Specialties, July 1955.

EXAMPLE 2

As a control for Example 1, the unethoxylated secondary alcohols were removed from a 250-gram aliquot of the crude ethoxylation admixture. The residual secondary alcohol ethoxylates, analyzing less than 0.5% by weight secondary alcohols, had a hydroxyl number of 163.4 (ave. M.W. 343). To 72.5 grams of this residue was added 27.5 grams of the secondary alcohol admixture in Example 1 to provide 100 grams of secondary alcohol ethoxylate-secondary alcohol admixture with a hydroxyl number of 191 (M.W. 294). This admixture was sulfated as in Example 1 using a stoichiometric weight of sulfamic acid to give a 99% yield by methylene blue analysis of the corresponding ammonium sulfate esters.

At a 0.05% active concentration, this nonionic detergent washed 20 dishes in 200 p.p.m. water.

EXAMPLE 3

As a further control for Example 1, 208 grams (1 mole) of the unethoxylated secondary alcohol admixture described in Example 1 was reacted for three hours at 115–125° C. with 97.1 grams (1 mole) of sulfamic acid. Upon cooling, analysis by the methylene blue method showed 1.3% of the secondary alcohol admixture to be in the form of its sulfate ester.

EXAMPLE 4

Operating as in Example 1, 415 grams of the secondary alcohol admixture described in Example 1 was propoxylated with 240 grams of propylene oxide. The resultant product, containing approximately 25% unchanged secondary alcohol, was converted in 99.3% yield to the corresponding sulfate ester using a stoichiometric quantity of sulfamic acid as the sulfating agent.

EXAMPLE 5

To 520 grams (4.0 moles) of purified octanol-2, there were added at 110° C., using 0.08% by weight $BF_3$ catalyst, 352 grams (8 moles) of ethylene oxide. The crude reaction mixture, weighing 872 grams, was made just alkaline to litmus paper with monoethanolamine and filtered.

To 109 grams (0.5 mole) of the above octanol-2 ethoxylate having a hydroxyl number of 390 (average M.W.=218), and containing 36% unreacted secondary alcohol there were added 48.5 grams (0.503 mole) of sulfamic acid at 110–115° C. After the addition was complete, the mixture was stirred for four hours at 110–115° C., made alkaline to litmus with ethanolamine, and diluted with 50-50 ethanol-water to a weight of 260 grams. By methylene blue analysis the desired ammonium sulfate ester of the secondary alcohol ethoxylate-secondary alcohol admixture was obtained in a 97.9% yield.

EXAMPLE 6

As a control experiment for Example 5, Example 2 was repeated substituting octanol-2 and octanol-2 based ethoxylates for the secondary alcohols and secondary alcohol ethoxylates. The yield of ammonium sulfate esters was found to be 99.4% by methylene blue analysis.

EXAMPLE 7

As a further control for Example 5, 130 grams (1 mole) of octanol-2 were reacted with 1 mole of sulfamic acid by the procedure described in Example 5. Methylene blue analysis showed that 0.7% of octanol-2 was converted to its corresponding ammonium sulfate ester.

EXAMPLE 8

To 369 grams (1 mole) of pentacosanol-2 there were added at 105° C. 0.1% by weight boron trifluoride followed by 220 grams (5 moles) of ethylene oxide. The crude reaction mixture, weighing 590 grams, was adjusted for a pH of 7.5 with monoethanolamine, filtered, and fractionally distilled to remove unethoxylated pentacosanol-2. Analysis of the residue, weighing 475 grams, by vapor phase chromatography showed no pentacosanol-2 in the residue.

To 300 grams of the residue (M.W.=743) there were added 33 grams of pure pentacosanol-2. To this mixture, having a hydroxyl value of 79.7% (M.W.=705), there was added the stoichiometric amount of sulfamic acid (46 grams, 0.473 mole) at 100–105° C. over a fifteen minute period. After the addition was complete, the mixture was heated for four hours at 115–120° C., made alkaline to litmus with monoethanolamine, and diluted with a 60–40 ethanol-water solution to a weight of 650 grams. The yield of ammonium sulfate ester was found to equal 94.7% by methylene blue analysis.

EXAMPLE 9

To a mixture containing 91 grams of dodecanol-2, 47 grams of dodecanol-3, and 46 grams of dodecanol-4 and 78 grams of a 5 mole ethoxylate of nonylphenol having a hydroxyl value 214 (M.W.=262), there were added at 95–100° C., 97.0 gram (1.0 mole) of sulfamic acid over one-half hour. After the addition was complete, the mixture was heated to 125–130° C., held for 3 hours, made alkaline to litmus with diethanolamine and diluted with a 35–65 ethanol water mixture to a weight of 600 grams. The yield of ammonium sulfate ester by methylene blue analysis was 91.3%.

We claim:

1. The process of sulfating secondary alcohols which comprises heating one mole of a mixture consisting of 10% to 70% by weight of at least one secondary alcohol of from 8 to 25 carbon atoms and from 30% to 90% by weight of a non-ionic surface active agent having the molecular configuration of the condensation product of at least one mole of alkylene oxide of from 2 to 4 carbon atoms with one mole of a hydroxyl compound selected from the class consisting of phenols, alkylphenols and primary aliphatic hydrocarbon alcohols of from 1 to 24 carbon atoms and secondary aliphatic hydrocarbon alcohols of from 3 to 24 carbon atoms with one mole of sulfamic acid at a temperature of from 100° to 150° C. for a period of time sufficient to convert the said secondary alcohol and the said non-ionic surface active agent to their respective sulfates.

2. The process according to claim 1 wherein the secondary alcohol is octanol-2.

3. The process according to claim 1 wherein the secondary alcohol is pentacosanol-2.

4. The process according to claim 1 wherein the secondary alcohol is a mixture of from 11 to 16 carbon atoms with an average molecular weight of 209.

5. The process according to claim 1 wherein the secondary alcohol is a mixture of dodecanol-2, dodecanol-3 and dodecanol-4 with a molecular weight of 262.

6. The process according to claim 1 wherein the said non-ionic surface active agent has the molecular configuration of the condensation product of 5 moles of ethylene oxide with one mole of nonylphenol.

References Cited

UNITED STATES PATENTS 2,452,943  11/1948  Malkemus et al. _____ 260—400
2,758,977  8/1956  Knowles et al. _____ 252—153

FOREIGN PATENTS 1,201,831  9/1965  Germany.

OTHER REFERENCES

Gilbert, Sulfonation and Related Reactions, Interscience Publishers, 1965, pp. 353 and 354.

CHARLES B. PARKER, *Primary Examiner.*

L. C. MARUZO, *Assistant Examiner.*